(12) United States Patent
Hsu

(10) Patent No.: US 11,043,716 B2
(45) Date of Patent: Jun. 22, 2021

(54) DUAL-BATTERY TENON STRUCTURE AND ELECTRONIC DEVICE WITH THE SAME

(71) Applicant: PEGATRON CORPORATION, Taipei (TW)

(72) Inventor: Chuntang Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 204 days.

(21) Appl. No.: 16/455,198

(22) Filed: Jun. 27, 2019

(65) Prior Publication Data

US 2020/0020899 A1 Jan. 16, 2020

(30) Foreign Application Priority Data

Jul. 12, 2018 (TW) .................................. 107209407

(51) Int. Cl.
*H01M 50/271* (2021.01)
*H01M 50/269* (2021.01)
*H01M 50/213* (2021.01)
*H01M 50/262* (2021.01)
*H01M 50/247* (2021.01)
*H01M 50/209* (2021.01)

(52) U.S. Cl.
CPC ....... *H01M 50/209* (2021.01); *H01M 50/213* (2021.01); *H01M 50/262* (2021.01); *H01M 50/269* (2021.01); *H01M 50/271* (2021.01); *H01M 50/247* (2021.01)

(58) Field of Classification Search
CPC .. H01M 50/20; H01M 50/269; H01M 50/209; H01M 50/213; H01M 50/262; H01M 50/271

See application file for complete search history.

(56) References Cited

U.S. PATENT DOCUMENTS

2011/0211325 A1* 9/2011 Kawada .............. H01M 50/209
361/807

* cited by examiner

*Primary Examiner* — Ula C Ruddock
*Assistant Examiner* — Armindo Carvalho, Jr.
(74) *Attorney, Agent, or Firm* — Muncy, Geissler, Olds and Lowe, P.C.

(57) ABSTRACT

A dual-battery electronic device with a tenon structure comprises a casing, two batteries, and a rotating tenon. The casing has two battery recesses for the two respective batteries. The rotating tenon is rotatably mounted on the casing and disposed between the two battery recesses for selectively engaging at least one of the two batteries. The rotating tenon is capable of being rotated to engage both the batteries, and is capable of being rotated to engage only one of the two batteries. As a result, no matter how the rotating tenon is rotated, the tenon engaging segment fixes at least one of the two batteries in the battery recess. Therefore, when a user replaces one of the two batteries, the rotating tenon keeps engaging the other battery, so as to avoid accidental power off caused by the two batteries falling out together during an inadvertent operation.

11 Claims, 12 Drawing Sheets

DUAL-BATTERY TENON STRUCTURE AND ELECTRONIC DEVICE WITH THE SAME

CROSS-REFERENCE TO RELATED APPLICATIONS

This application is based upon and claims priority under 35 U.S.C. 119 from Taiwan Patent Application No. 107209407 filed on Jul. 12, 2018, which is hereby specifically incorporated herein by this reference thereto.

BACKGROUND

1. Technology Field

The present invention relates to a tenon structure for engaging and fixing batteries, especially to a rotating tenon that is capable of engaging two batteries or two battery covers, and an electronic device with the same.

2. Description of the Prior Arts

A conventional portable electronic device needs to be installed with a battery as a power source. The portable electronic device powered by a replaceable battery usually has a battery recess to accommodate the battery and is equipped with a battery cover to cover the battery after the battery is placed by a user. The battery cover has a tenon to engage and fix the battery cover to prevent the battery from falling out. In addition, another conventional portable electronic device has no battery cover. That is, the battery is exposed out, and the tenon directly engages and fixes the battery.

As the demand for prolonged usage time of the electronic device keeps increasing, an electronic device equipped with two batteries is developed, which not only extends the usage time of the electronic device, but also allows the user to change the batteries without shutting down the electronic device. That is, only one of the two batteries is removed for replacement, and the other battery keeps supplying electricity so that the electronic device does not need to be shut down. This kind of electronic device is usually equipped with two tenons to engage the two respective batteries (or two respective battery covers). However, the dual-tenon structure has the following shortcomings.

First, the two tenons occupy more space in the electronic device, which is against the trend toward lightness, slimness, and compactness of the portable electronic device. Besides, the two tenons also raise the cost.

Second, the two tenons are operated individually, and thus the two tenons may be released at the same time, or one of the tenons may be accidentally released while the other tenon is being released. Both of the two situations would make the two batteries no longer fixed and thus fall out at the same time, which results in the abrupt power off of the electronic device.

As a result, the conventional tenon structure of the dual-battery electronic device needs to be improved.

To overcome the shortcomings, the present invention provides a dual-battery tenon structure and an electronic device with the same to mitigate or obviate the aforementioned problems.

SUMMARY

The main objective of the present disclosure is to provide a dual-battery tenon structure and an electronic device with the same that not only fix two batteries but also prevent the other battery from loosening off when removing one of the two batteries for replacement.

According to an embodiment, the dual-battery electronic device has a casing, two batteries, and a rotating tenon. The casing has two battery recesses concaved in the casing and spaced apart from each other. The two batteries are mounted in the two respective battery recesses. Each of the two batteries has a battery engaging segment exposed out of an opening of the battery recess. The rotating tenon is rotatably mounted on the casing, and is disposed between the two battery recesses for selectively engaging at least one of the two batteries. The rotating tenon has a tenon engaging segment. The rotating tenon is capable of being rotated relative to the casing to make the tenon engaging segment engage the two battery engaging segments of both the two batteries, and the rotating tenon is capable of being rotated relative to the casing to make the tenon engaging segment engage the battery engaging segment of only one of the two batteries.

According to an embodiment, the dual-battery tenon structure has a casing, two battery covers, and a rotating tenon. The casing has two battery recesses concaved in the casing and spaced apart from each other. The two battery covers cover the two respective battery recesses. Each of the two battery covers has a battery engaging segment. The rotating tenon is rotatably mounted on the casing, and is disposed between the two battery recesses for selectively engaging at least one of the two battery covers. The rotating tenon has a tenon engaging segment. The rotating tenon is capable of being rotated relative to the casing to make the tenon engaging segment engage the two battery engaging segments of both the two battery covers, and the rotating tenon is capable of being rotated relative to the casing to make the tenon engaging segment engage the battery engaging segment of only one of the two battery covers.

According to an embodiment, the dual-battery tenon structure is for engaging at least one of two batteries, and the dual-battery tenon structure comprises a casing and a rotating tenon. The casing has two battery recesses concaved in the casing and spaced apart from each other. The two battery recesses are for accommodating the two respective batteries. The rotating tenon is rotatably mounted on the casing, and is disposed between the two battery recesses for selectively engaging at least one of the two batteries. The rotating tenon has a tenon engaging segment. The rotating tenon is capable of being rotated relative to the casing to make the tenon engaging segment engage both the two batteries, and the rotating tenon is capable of being rotated relative to the casing to make the tenon engaging segment engage only one of the two batteries.

According to an embodiment, the two batteries (or two battery covers) each respectively have a battery engaging segment, and the rotating tenon has a tenon engaging segment. The rotating tenon is rotatably mounted between the two batteries and is capable of making the tenon engaging segment engage the battery engaging segment of one of the two batteries or is capable of engaging the two battery engaging segments of both the two batteries when the rotating tenon is rotated. Alternatively, when used with the conventional battery, the tenon engaging segment is capable of abutting one of the two batteries or the two batteries both when the rotating tenon is rotated. As a result, no matter how the rotating tenon is rotated, the tenon engaging segment fixes at least one of the two batteries in the battery recess. Therefore, when a user is replacing one of the two batteries, the rotating tenon is rotated to make the tenon engaging segment detach from the battery, and then said battery is loosened and is capable of being taken out. However, at the same time, the rotating tenon keeps engaging the other battery to prevent both of the two batteries from falling out during an inadvertent operation. Compared with the conventional dual-battery electronic device, which may accidentally release the two tenons at the same time and result in the falling out of the two batteries and the abrupt power off, the present invention can effectively avoid accidental power off by only one rotating tenon. Furthermore, the one single rotating tenon is also capable of reducing the occupying space, simplify the structure, and lower the cost.

Other objectives, advantages and novel features of the invention will become more apparent from the following detailed description when taken in conjunction with the accompanying drawings.

DETAILED DESCRIPTION

Figure 1:
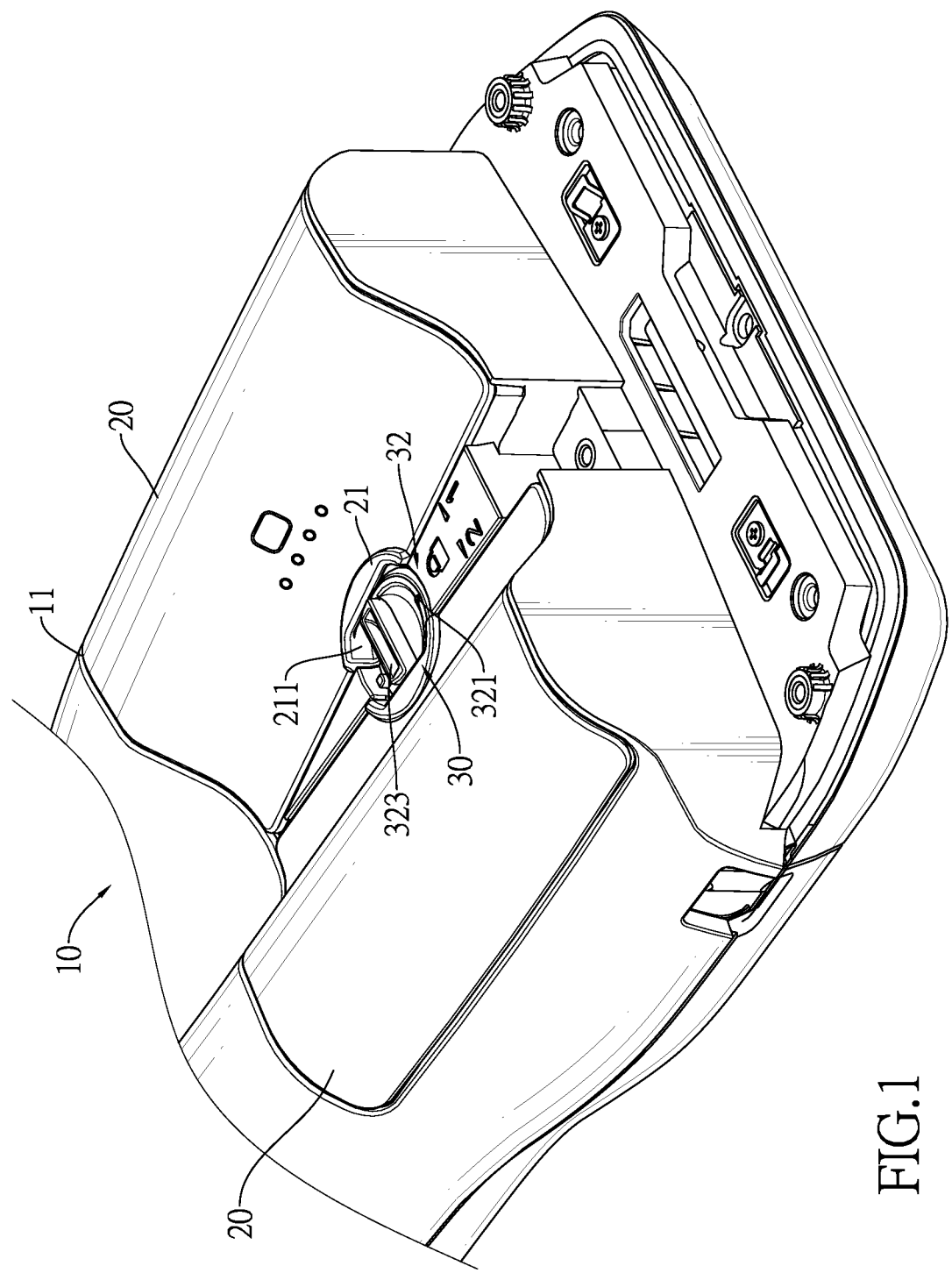
FIG. 1 is a perspective view of a first embodiment of an electronic device in accordance with the present invention.
Figure 2:
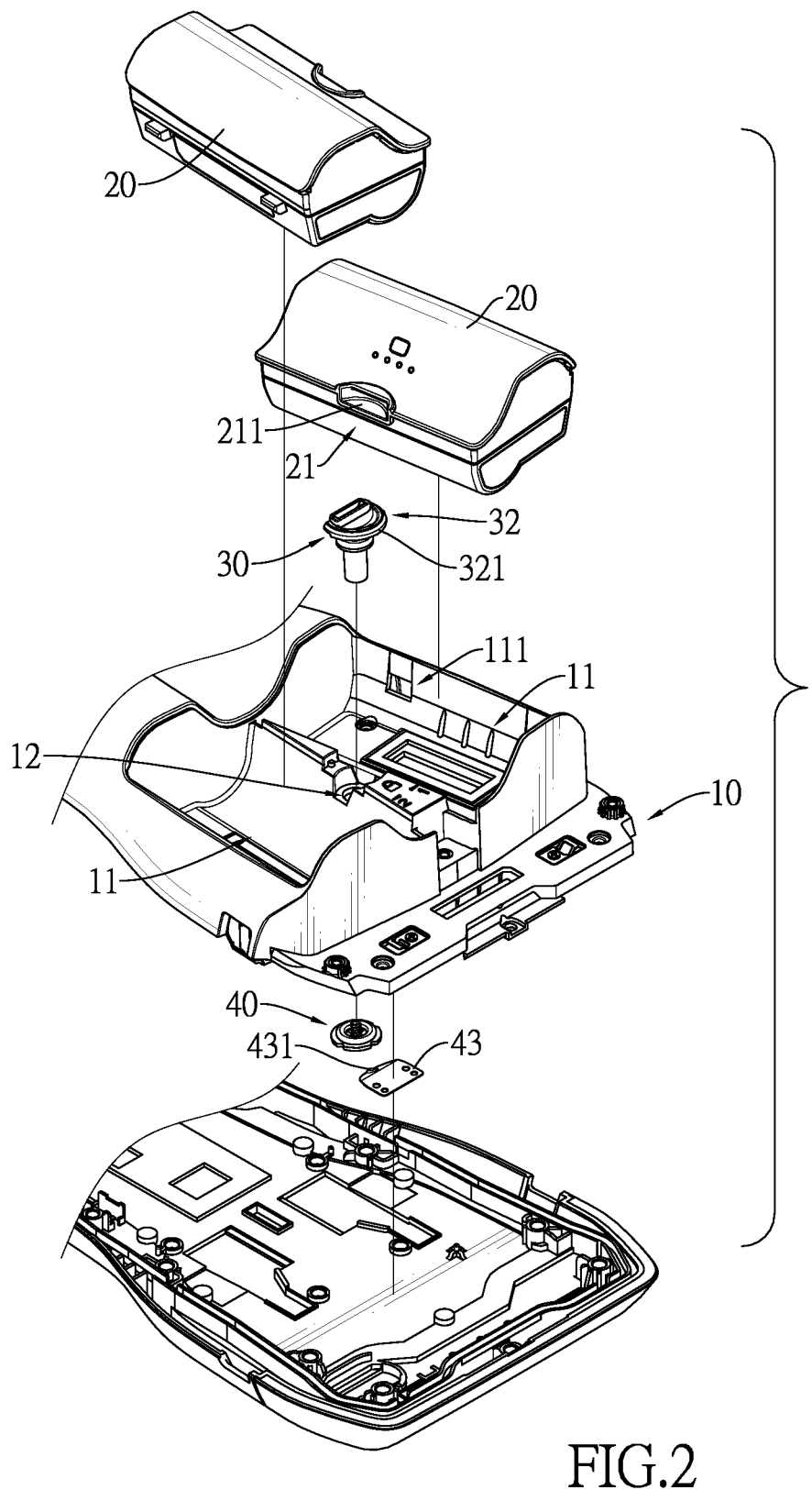
FIG. 2 is an exploded perspective view of the electronic device in FIG. 1.

With reference to FIGS. 1 and 2, a first embodiment of a dual-battery electronic device in accordance with the present invention comprises a casing 10, two batteries 20 and a rotating tenon 30.

Figure 9:
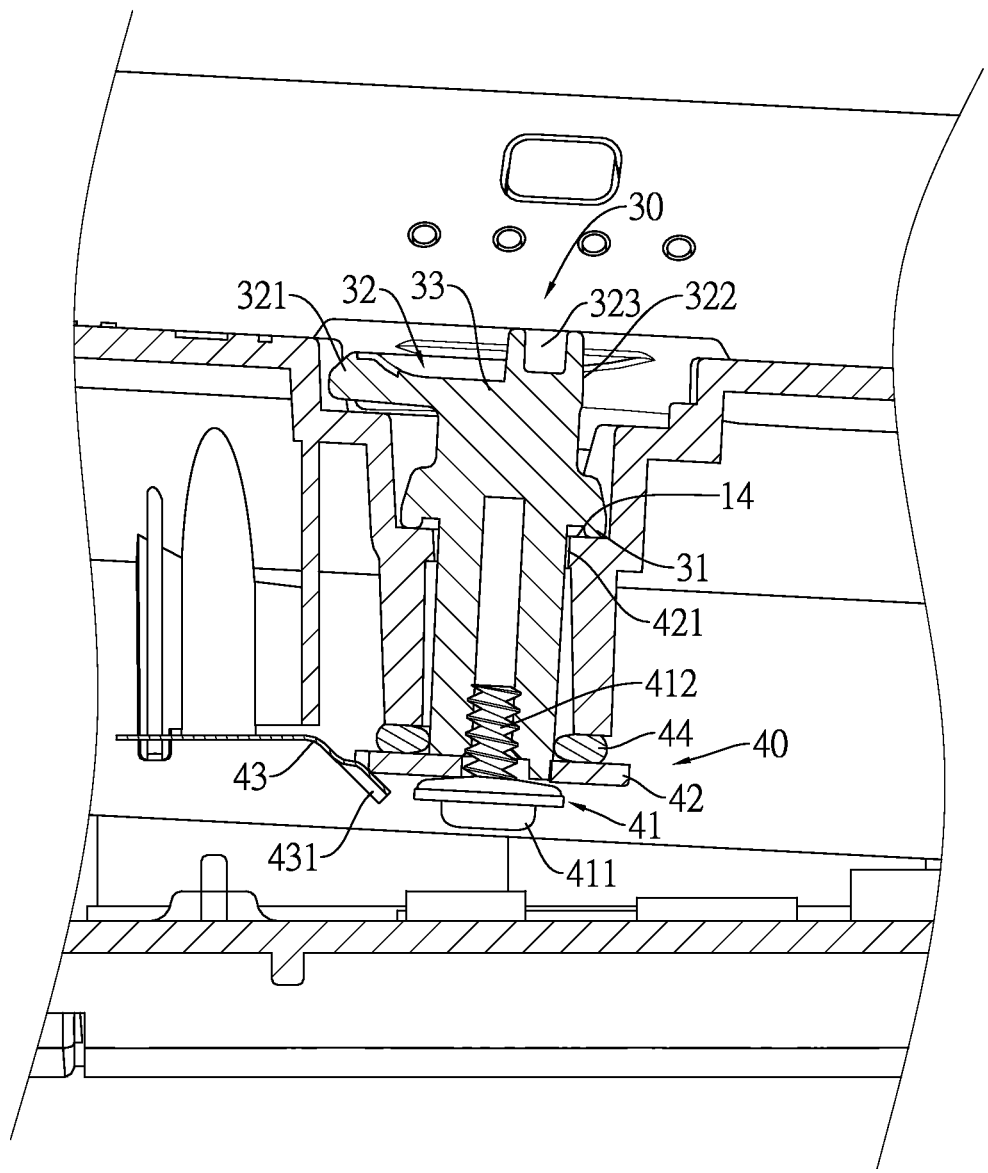
FIG. 9 is a side view in partial section of the rotation tenon of the electronic device in FIG. 1.

With reference to FIGS. 1, 2, 4, and 7, the casing 10 may be a part or a whole of a casing of an ordinary electronic device. The casing 10 has two battery recesses 11 and a through hole 12. The two battery recesses 11 and the through hole 12 are concaved in a surface of the casing 10. The two battery recesses 11 are spaced apart from each other. In a preferred embodiment, the battery recesses 11 are substantially rectangular in shape, and two corners of the two battery recesses 11 are connected to each other. The two battery recesses 11 are non-parallel and intersect to form a triangular region, thereby reducing the space occupied by the two battery recesses 11 in the casing 10, compared with the two battery recesses 11 arranged side by side. However, the two battery recesses 11 are not limited by the aforementioned arrangement, and can be altered into other configuration. The through hole 12 is disposed between the two battery recesses 11. In addition, in a preferred embodiment, the casing 10 further has a tube segment 13 protruding from an inner wall of the casing 10. The tube segment 13 is disposed between the two battery recesses 11, and locates at the through hole 12. The tube segment 13 has a stepped surface 14 annularly protruding from an inner wall of the tube segment 13 toward the through hole 12 as shown in FIG. 9.

With reference to FIGS. 1 to 3 and 7, the two batteries 20 are mounted in the two respective battery recesses 11 of the casing 10, and each battery 20 has a battery engaging segment 21. The battery engaging segment 21 is exposed out of an opening 111 of the battery recess 11. In other words, each battery engaging segment 21 is positioned higher than the opening 111 of the battery recess 11. In a preferred embodiment, each battery engaging segment 21 has an engaging recess 211, and the engaging recess 211 is mounted on the battery engaging segment 21 at a position higher than the opening 111 of the battery recess 11, but the position of the engaging recess 211 is not limited thereto.

The rotating tenon 30 is rotatably mounted on the casing 10, and is disposed between the two battery recesses 11. In a preferred embodiment, the rotating tenon 30 is mounted through the through hole 12 and the tube segment 13 of the casing 10. The rotating tenon 30 has an abutting segment 31 annularly protruding from an outer wall of the rotating tenon 30. The abutting segment 31 protrudes toward an inner side of the casing 10 and abuts the stepped surface 14 of the tube segment 13. The rotating tenon 30 has a tenon engaging segment 32 protruding from the rotating tenon 30. The tenon engaging segment 32 engages the battery engaging segment 21 of at least one of the two batteries 20. In other words, the rotating tenon 30 is capable of being rotated relative to the casing 10 to make the tenon engaging segment 32 engage into the two engaging recesses 211 of the two battery engaging segments 21 of both the two batteries 20. The rotating tenon 30 is also capable of being rotated relative to the casing 10 to make the tenon engaging segment 32 only engage into the engaging recess 211 of the battery engaging segment 21 of one of the two batteries 20. That is, no matter how the rotating tenon 30 is rotated, the tenon engaging segment 32 engages the battery engaging segment 21 of at least one of the two batteries 20. To be specific, when the user sees the casing 10 from an axis of the rotating tenon 30, the tenon engaging segment 32 always overlaps with at least one of the two batteries 20 regardless of any angle to which the rotating tenon 30 is rotated.

The main function of the rotating tenon 30 is fixing both of the two batteries 20 or fixing one of the two batteries 20. As a result, the tenon engaging segment 32 can be altered in any shapes as long as the tenon engaging segment 32 is capable of selectively engaging the two battery engaging segments 21 of both the two batteries 20 or the battery engaging segment 21 of one of the two batteries 20 during the rotation. In a preferred embodiment, with reference to FIGS. 2, 3, 7 and 8, the rotating tenon 30 further has a post 33, and the tenon engaging segment 32 has an annular flange 321 and an interference-avoidance cut surface 322. The annular flange 321 annularly protrudes from an outer wall of the post 33 and around the center of the post 33, and is attached to the battery engaging segment 21 of at least one of the two batteries 20. To be specific, the annular flange 321 is inserted into the engaging recess 211 of the battery engaging segment 21. The structure of the engaging recess 211 of the battery engaging segment 21 is capable of providing stable support to the annular flange 321. The interference-avoidance cut surface 322 is concaved in the annular flange 321 toward the center of the post 33, which makes an arc of the annular flange 321 less than 360 degrees. In a preferred embodiment, the arc of the annular flange 321 is equal to or larger than 180 degrees, and is preferably, but not limited to, from 180 degrees to 190 degrees. The arc of the annular flange 321 may be other degrees as long as the annular flange 321 is capable of being inserted into the engaging recess 211 of the battery engaging segment 21 of at least one of the two batteries 20 regardless of the rotation of the rotating tenon 30.

Figure 5:
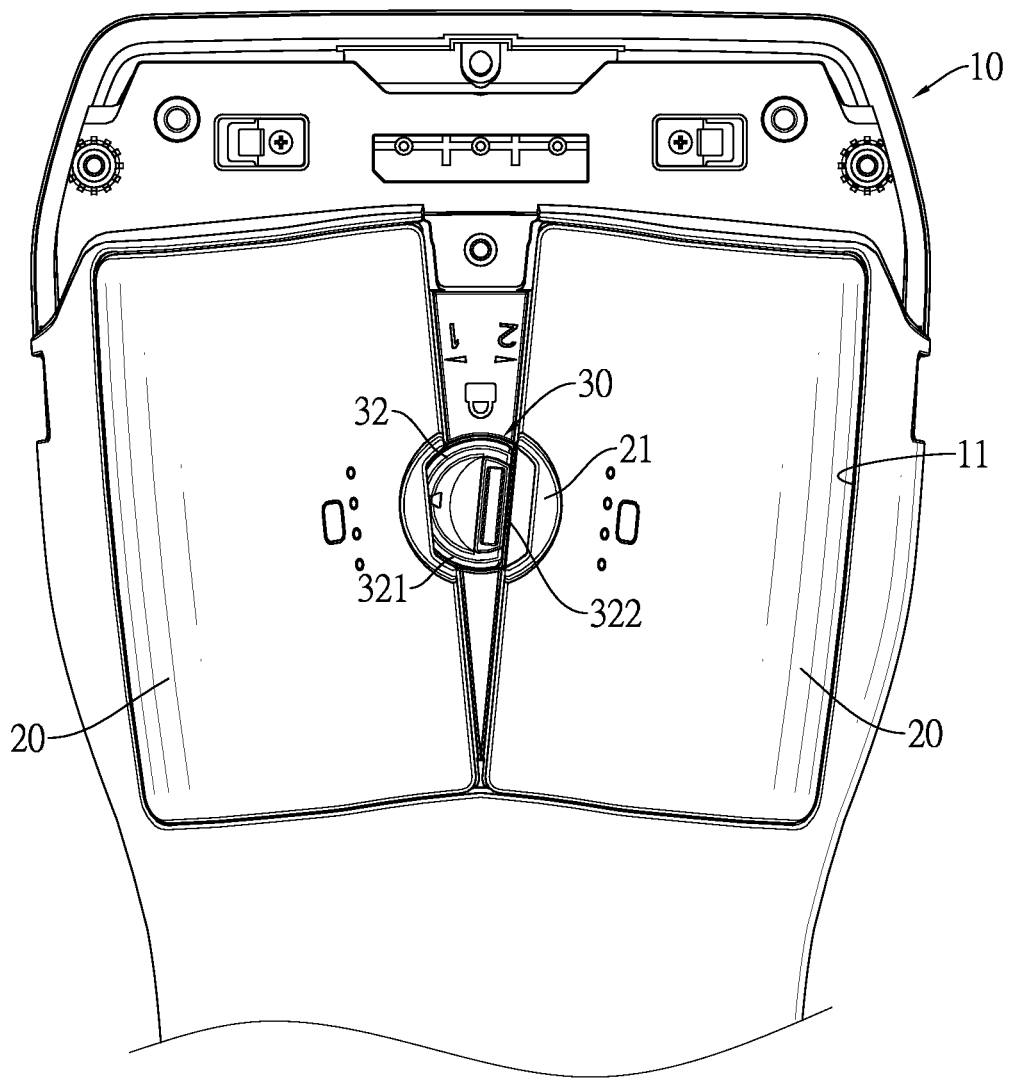
FIGS. 5 and 6 are top views of the electronic device in FIG. 1, showing the rotating tenon engaging only one of the two batteries.
Figure 8:
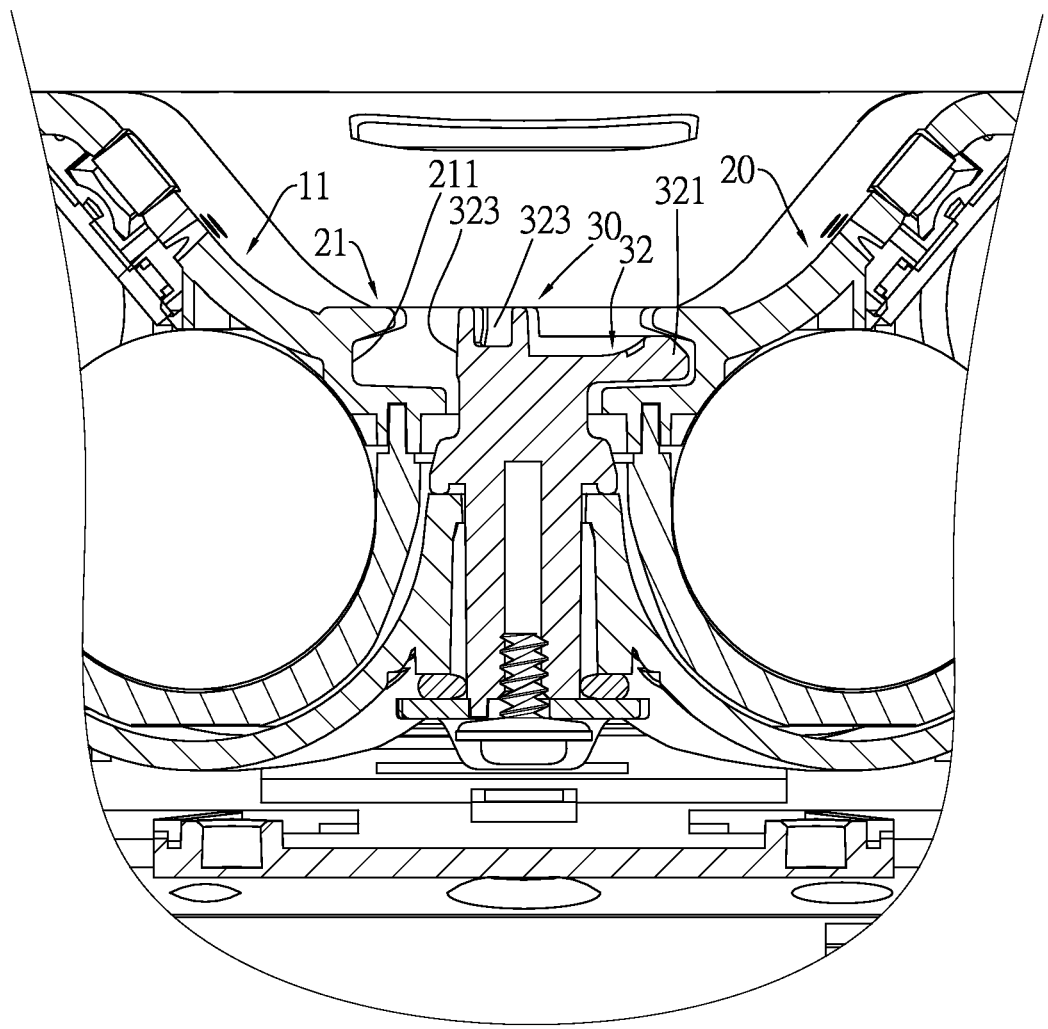

The function of the interference-avoidance cut surface 322 is making the tenon engaging segment 32 detach from one of the two battery engaging segments 21. To be specific, when the rotating tenon 30 is rotated to make the interference-avoidance cut surface 322 face the battery engaging segment 21 of one of the two batteries 20, the interference-avoidance cut surface 322 substantially aligns with an edge of the opening 111 of the battery recess 11 of said battery 20, and the annular flange 321 is not be inserted into the engaging recess 211 of the battery engaging segment 21 of said battery 20 as shown in FIGS. 5 and 8, so that said battery 20 is capable of being taken out. But at this time, the annular flange 321 is still inserted in the battery engaging segment 21 of the other battery 20, thereby ensuring that said the other battery 20 is incapable of being taken out at this time. Besides, in a preferred embodiment, the interference-avoidance cut surface 322 is not only concaved in the annular flange 321 toward the center of the post 33, but also further concaved deep into the post 33, thereby increasing an area of the interference-avoidance cut surface 322.

Figure 3:
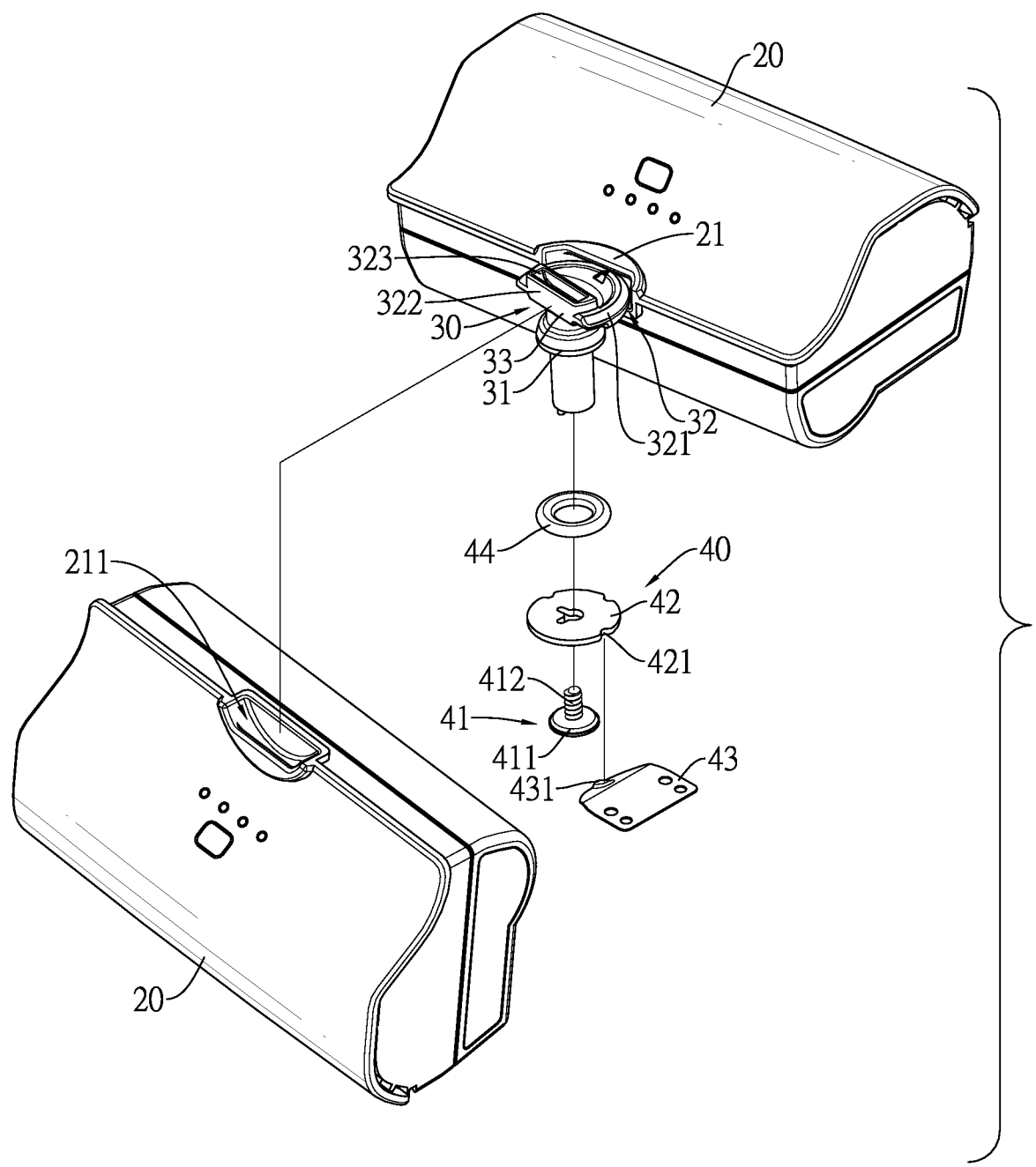
FIG. 3 is an exploded perspective view of a rotating tenon and two batteries of the electronic device in FIG. 1.
Figure 4:
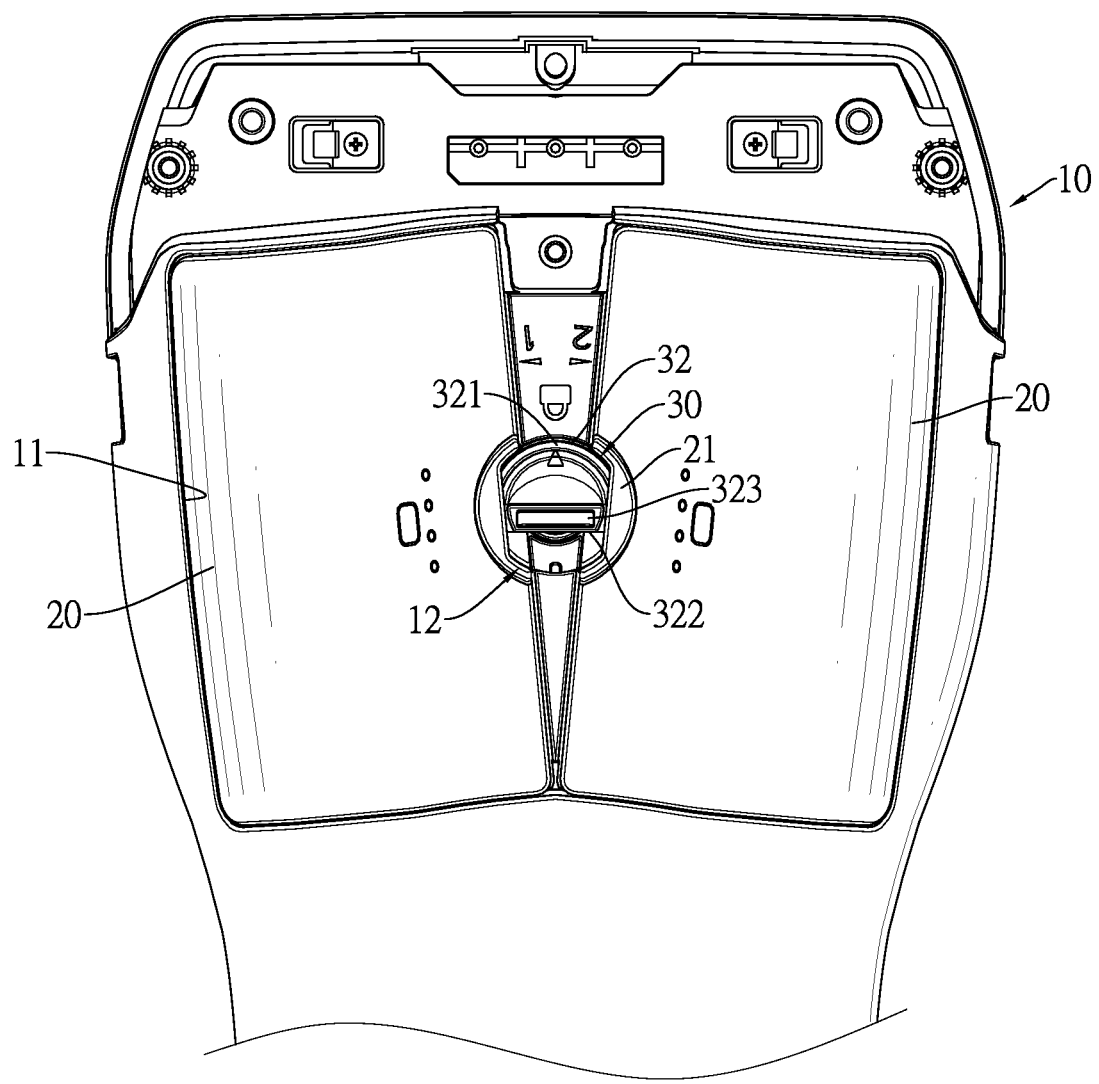
FIG. 4 is a top view of a rotating tenon and a battery of the electronic device in FIG. 1, showing the rotating tenon engaging both the two batteries.

With reference to FIGS. 3 and 4, in a preferred embodiment, the rotating tenon 30 further has an operating recess 323 on an end of the rotating tenon 30. The operating recess 323 is formed in a shape that allows a tool such as a screwdriver to be inserted therein, so that the user can rotate the rotating tenon 30 not only by inserting fingers but also by inserting a tool into the operating recess 323.

With reference to FIGS. 2, 3, 7, and 9, in a preferred embodiment, the present invention further has a locking assembly 40 located in the casing 10 and connected to the rotating tenon 30. The locking assembly 40 has a locking element 41, a limiting element 42, a positioning element 43, and a waterproof gasket 44.

The locking element 41 is mounted in the tube segment 13, and has a head segment 411 and a rod segment 412 connected to each other. The rod segment 412 is mounted in and screw-threaded with the end of the rotating tenon 30. In a preferred embodiment, the locking element 41 is preferably, but not limited to, a screw, as long as the locking element 41 is capable of achieving the fixing.

The limiting element 42 is a round flat plate, and is mounted in the casing 10. The limiting element 42 is mounted around the rod segment 412 of the locking element 41, and is clamped between the head segment 411 of the locking element 41 and the end of the tube segment 13. In a preferred embodiment, the limiting element 42 is unrotatably connected to the end of the rotating tenon 30. In other words, the limiting element 42 and the rotating tenon 30 mutually rotate with each other, or when one of the two units is unrotatable, said unit stops the other unit from rotating. The limiting element 42 further has three notches 421 concaved in a periphery of the limiting element 42.

The positioning element 43 is a panel and is mounted securely in the casing 10 as shown in FIG. 9. The positioning element 43 has a protruding segment 431. The protruding segment 431 is attached to the periphery of the limiting element 42 or selectively engages into one of the three notches 421 of the limiting element 42. When the rotating tenon 30 is rotated to any of the three status (the tenon engaging segment 32 engaging the battery engaging segment 21 of either one of the two batteries 20, or the tenon engaging segment 32 engaging both of the battery engaging segments 21), the protruding segment 431 also engages one of the three notches 421. That is, the three notches 421 precisely position the rotating tenon 30 and prevent the positioned rotating tenon 30 from rotating.

Figure 10:
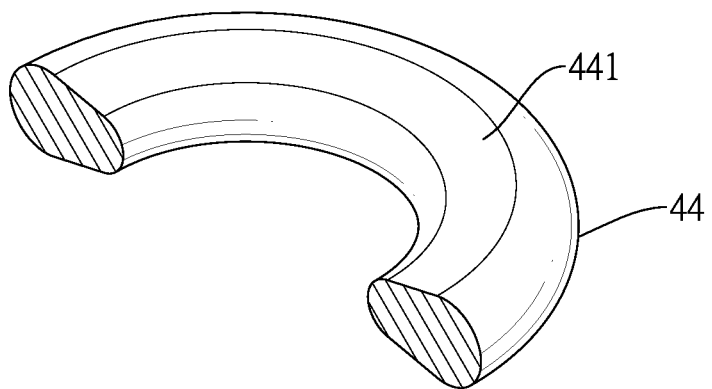
FIG. 10 is a perspective view in partial section of a waterproof gasket of the electronic device in FIG. 1.

The waterproof gasket 44 is mounted around the rotating tenon 30, and is clamped between the limiting element 42 and the end of the tube segment 13, thereby achieving the waterproof function. In a preferred embodiment, with reference to FIG. 10, the waterproof gasket 44 further has a gasket cut surface 441. The gasket cut surface 441 is annularly inclined from a periphery toward a center of the waterproof gasket 44 to form an annular slope. But the waterproof gasket is not limited to the above configuration. The locking assembly 40 is capable of working without the waterproof gasket 44, or the waterproof gasket 44 is capable of working without the gasket cut surface 441.

One of two ends of the rotating tenon 30 abuts the stepped surface 14. The other end of the rotating tenon 30 is mounted in the limiting element 42 and the waterproof gasket 44 via the locking element 41, which is fixed and screw-threaded in the rotating tenon 30. Therefore, the rotating tenon 30 is limited by the tube segment 13 of the casing 10 and is non-detachable from the casing 10, but the rotating tenon 30 is still rotatable relative to the tube segment 13 of the casing 10.

Figure 11:
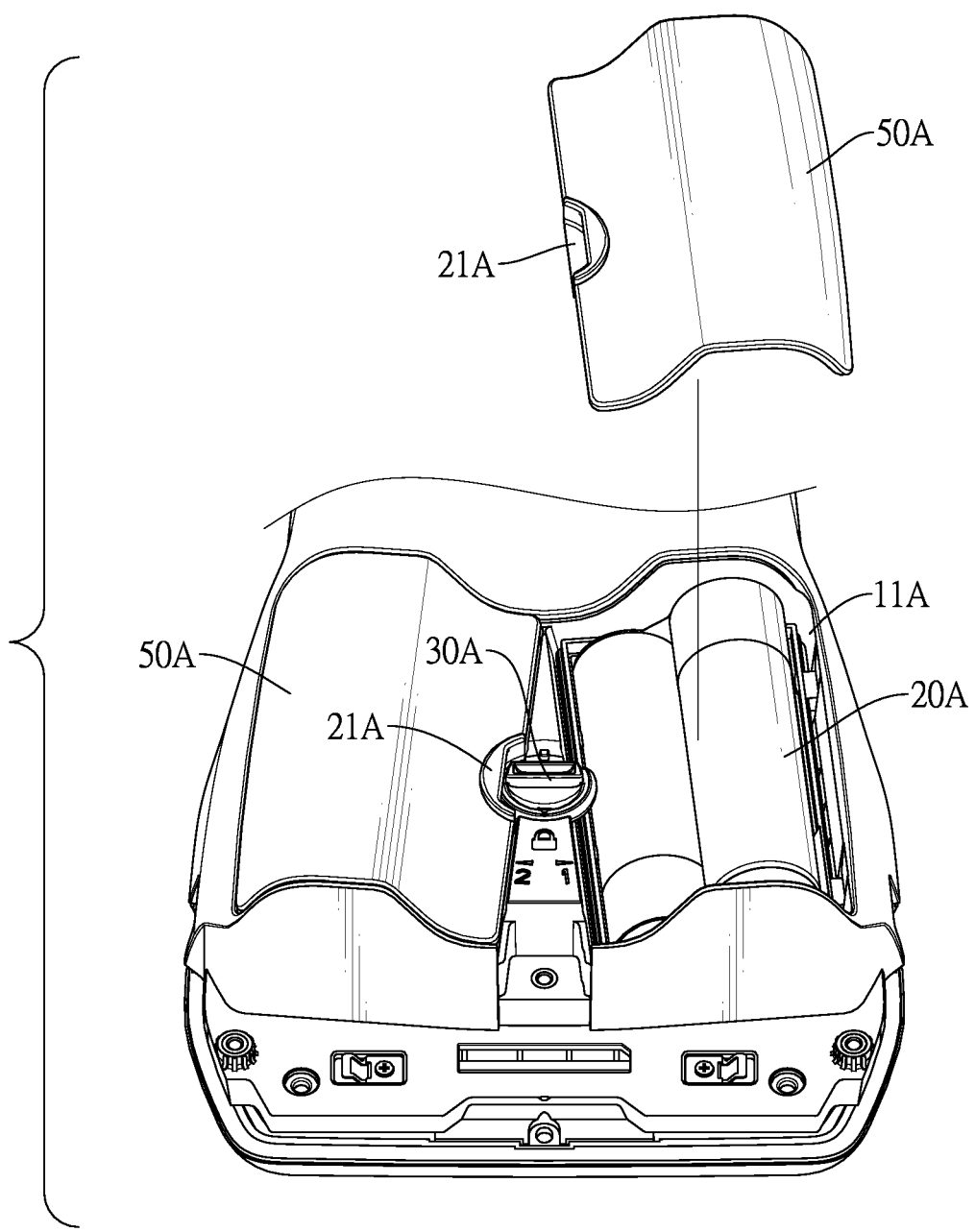
FIG. 11 is a perspective view of a second embodiment of an electronic device in accordance with the present invention.

With reference to FIG. 11, a second embodiment of the present invention is substantially similar to the first embodiment mentioned above, and the difference between the first and second embodiments is as follows. The two batteries 20 in the first embodiment are exposed out, and thus the battery engaging segment 21 is mounted on the battery 20. The rotating tenon 30 engages the battery engaging segment 21 of the battery 20 directly to fix the battery 20. However, the second embodiment further includes two battery covers 50A to cover the two respective battery recesses 11A, and the battery 20A is limited by the battery cover 50A and thus is fixed in the battery recess 11A. Therefore, in the second embodiment, the battery engaging segment 21A is mounted on the battery cover 50A, and the rotating tenon 30A prevents the battery 20A from falling out by the engaging battery cover 50A. In the second embodiment, the battery engaging segment 21A is just modified to be mounted on the battery cover 50A. The battery engaging segment 21A and other components and the detailed structure thereof in the second embodiment are the same as those in the first embodiment, and thus are not repeated.

Figure 6:
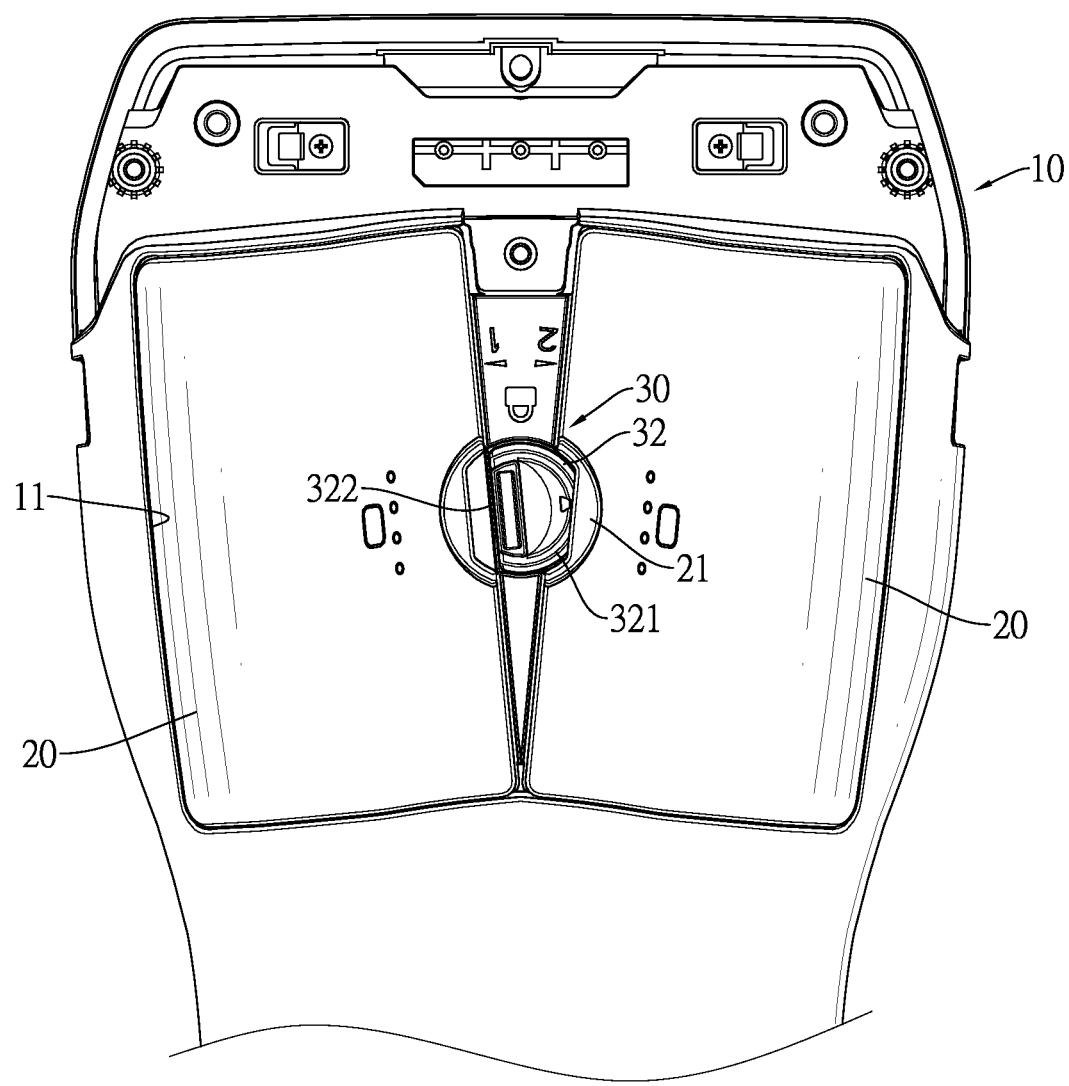
Figure 7:
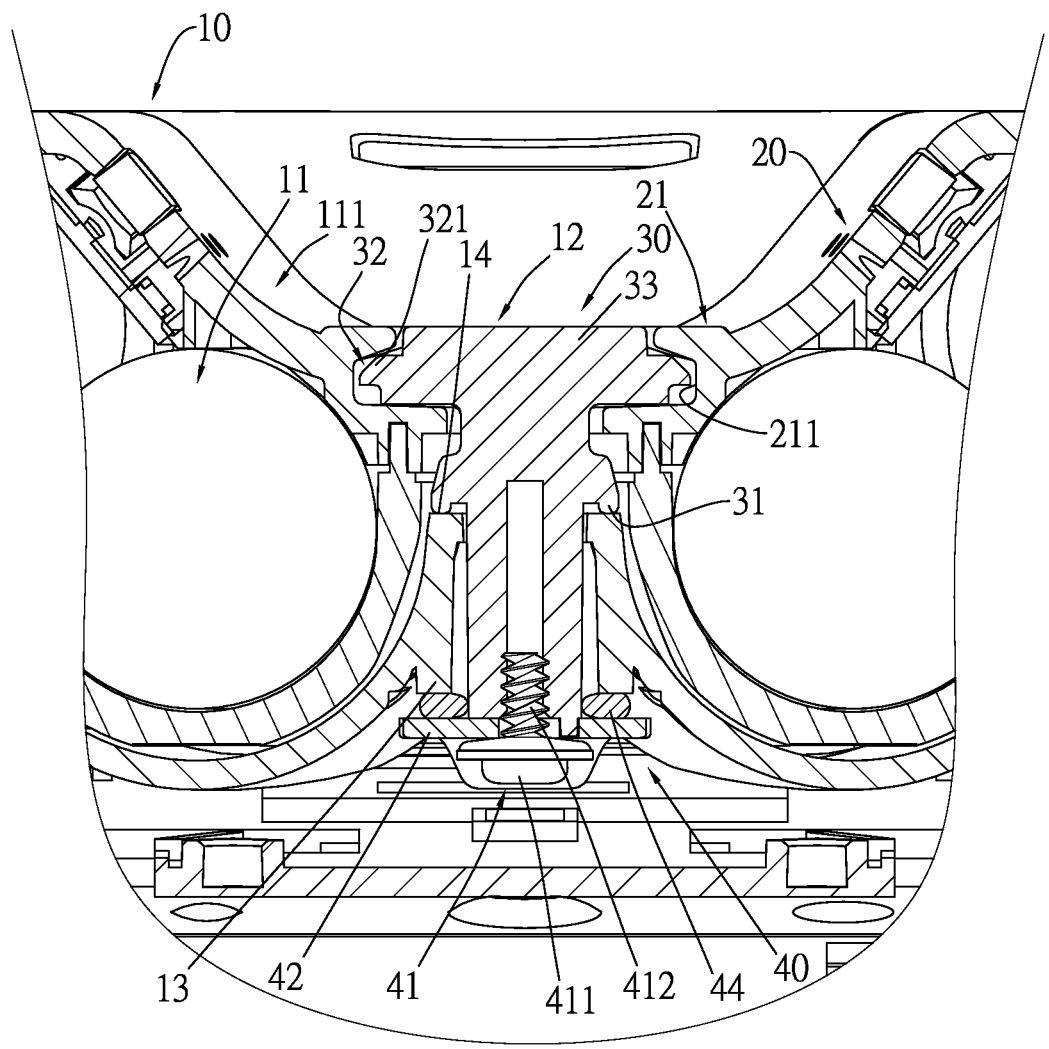
FIGS. 7 and 8 are front views in partial section of the electronic device in FIG. 1, showing the rotating tenon before and after rotated, respectively.

When the present invention is in use, with reference to FIGS. 3 to 6, normally, the rotating tenon 30 engages both the two batteries 20 as shown in FIG. 4, and the two batteries 20 are capable of together supplying electricity. To take out one of the two batteries 20, the rotating tenon 30 is rotated to make the annular flange 321 locate at the battery engaging segment 21 of the other battery 20 (in other words, the interference-avoidance cut surface 322 aligns with the edge of the opening 111 of the battery recess 11 of the battery 20 that is to be taken out), the battery 20 is capable of being taken out as shown in FIG. 5 or 6. At this time, the other battery 20 will not fall out because said battery 20 has been engaged by the annular flange 321. When the user takes out the used battery 20 and puts a new one in the battery recess 11, the user only needs to rotate the rotating tenon 30 to the original angle as shown in FIG. 4, and then the rotating tenon 30 engages both the two batteries 20 again. During the rotation, the engagement between the three notches 421 of the limiting element 42 and the protruding segment 431 of the positioning element 43 helps the user to know that the rotating tenon 30 has been rotated to specific angles. Besides, the engagement between the three notches 421 and the protruding segment 431 also prevents the rotating tenon 30 from rotating when accidental touch occurs during replacement of the battery 20.

The present invention can easily switch the engaging status by simply rotating one single rotating tenon 30 to fix both the two batteries 20 or to fix one of the two batteries 20. During the rotation of the rotating tenon 30, no matter how the rotating tenon 30 is rotated, the tenon engaging segment 32 engages the battery engaging segment 21 of at least one of the two batteries 20, thereby preventing both of the two batteries 20 falling out together during an inadvertent operation, which may cause power off of the electronic device. Furthermore, the one single rotating tenon 30 is also capable of reducing the occupying space, simplify the structure, and lower the cost. Lastly, the rotating tenon 30 is installed with a waterproof gasket 44, and the waterproof gasket 44 has a gasket cut surface 441 to reduce the friction between the rotating tenon 30 and the waterproof gasket 44 during the rotation. Besides, the waterproof gasket 44 also provides the waterproof function.

In addition, in a preferred embodiment, the battery engaging segment 21 includes an engaging recess 211, and the tenon engaging segment 32 has an annular flange 321, which protrudes into the battery recess 11, to engage the engaging recess 211 of the battery engaging segment 21, but it is not limited thereto. In another preferred embodiment, the battery engaging segment 21 is also capable of upwardly protruding from the battery 20 to an upper region between the two battery recesses 11. Therefore, the tenon engaging segment 32 is still capable of being attached to the battery engaging segment 21 without protruding into the battery recess 11, thereby fixed to the battery engaging segment 21. Besides, the tenon engaging segment 32 also can be altered in structural configurations other than the annular flange 321 and the interference-avoidance cut surface 322, as long as the tenon engaging segment 32 is capable of being attached to the battery engaging segment 21 toward the casing 10.

Figure 12:
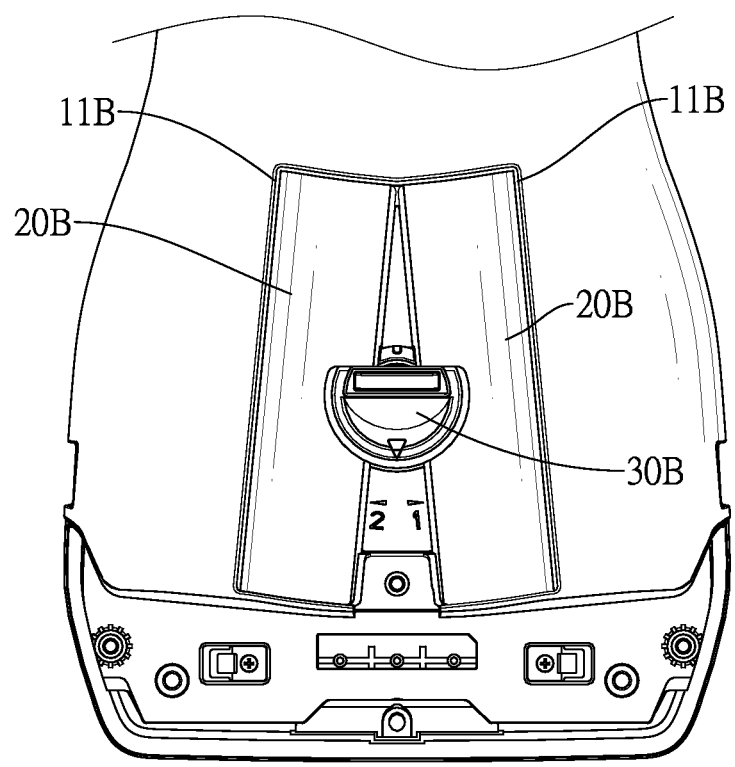
FIG. 12 is a top view of a third embodiment of an electronic device in accordance with the present invention.

With reference to FIG. 12, a third embodiment of the present invention is substantially similar to the first embodiment mentioned above, and the difference between the third embodiment and the first embodiment is as follows. The battery 20 in the first embodiment has the battery engaging segment 21, but in the third embodiment, the battery 20B does not have additional battery engaging segment, and the third embodiment adopts the general commercially-available battery 20B instead. The rotating tenon 30B is rotated to abut an outer surface of the battery 20B, and engages the battery 20B in the battery recess 11B to prevent the battery 20B from falling out, so that the third embodiment is also capable of avoiding power off caused by both of the two batteries 20B falling out together during an inadvertent operation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual-battery electronic device comprising:
   a casing comprising two battery recesses concaved in the casing and spaced apart from each other;
   two batteries mounted in the two respective battery recesses, each of the two batteries comprising a battery engaging segment exposed out of an opening of the battery recess; and
   a rotating tenon rotatably mounted on the casing, and disposed between the two battery recesses for selectively engaging at least one of the two batteries, the rotating tenon comprising a tenon engaging segment;
   wherein the rotating tenon is capable of being rotated relative to the casing to make the tenon engaging segment engage the two battery engaging segments of both the two batteries, and the rotating tenon is capable of being rotated relative to the casing to make the tenon engaging segment engage the battery engaging segment of only one of the two batteries.

2. The dual-battery electronic device as claimed in claim 1, wherein the rotating tenon comprises a post, and the tenon engaging segment comprises an annular flange annularly protruding from the post and attached to the battery engaging segment of at least one of the two batteries, wherein the rotating tenon is capable of being rotated relative to the casing to make the annular flange attached to the two battery engaging segments of both the two batteries, and the rotating tenon is capable of being rotated relative to the casing to make the annular flange attached to the battery engaging segment of only one of the two batteries; and the tenon engaging segment comprises an interference-avoidance cut surface formed on the annular flange toward a center of the post, wherein when the rotating tenon is rotated relative to the casing to make the interference-avoidance cut surface detach from the battery engaging segment of one of the two batteries, the annular flange is only attached to the battery engaging segment of the other battery.

3. The dual-battery electronic device as claimed in claim 2, wherein an arc of the annular flange is equal to or larger than 180 degrees.

4. The dual-battery electronic device as claimed in claim 2, wherein the rotating tenon comprises an operating recess concaved in an end of the rotating tenon to be inserted by a tool for rotating the rotating tenon.

5. The dual-battery electronic device as claimed in claim 1, wherein the battery engaging segment of each of the two batteries comprises an engaging recess, when the battery engaging segment engages the tenon engaging segment, the tenon engaging segment is inserted in the engaging recess of the battery engaging segment.

6. The dual-battery electronic device as claimed in claim 1, wherein the casing comprises a tube segment protruding from an inner wall of the casing and disposed between the two battery recesses, the rotating tenon is rotatably mounted in the tube segment; and the dual-battery electronic device further comprises a locking assembly mounted in the casing and connected to the rotating tenon, and the locking assembly comprises:
   a locking element mounted in the tube segment, and comprising a head segment and a rod segment connected to the head segment and mounted in and screw-threaded with an end of the rotating tenon; and
   a limiting element mounted in the casing, mounted around the rod segment of the locking element, and clamped between an end of the tube segment and the head segment of the locking element.

7. The dual-battery electronic device as claimed in claim 6, wherein the locking assembly further comprises a waterproof gasket mounted around the rotating tenon, and clamped between the limiting element and the end of the tube segment, and the waterproof gasket comprising a gasket cut surface.

8. The dual-battery electronic device as claimed in claim 6, wherein the limiting element is unrotatably connected to the end of the rotating tenon, and comprises three notches concaved in a periphery of the limiting element; and the locking assembly further comprises a positioning element mounted securely in the casing, and the positioning element comprises a protruding segment selectively engaging one of the three notches of the limiting element, wherein when the protruding segment engages one of the three notches of the limiting element, the tenon engaging segment engages the two battery engaging segments of both the two batteries or the tenon engaging segment engages the battery engaging segment of only one of the two batteries.

9. The dual-battery electronic device as claimed in claim 6, wherein the casing comprises a stepped surface annularly protruding from an inner wall of the tube segment; and the rotating tenon comprises an abutting segment annularly protruding from an outer wall of the rotating tenon and abutting against the stepped surface toward the limiting element.

10. A dual-battery tenon structure comprising:
a casing comprising two battery recesses concaved in the casing and spaced apart from each other;
two battery covers covering the two respective battery recesses, each of the two battery covers comprising a battery engaging segment; and
a rotating tenon rotatably mounted on the casing, and disposed between the two battery recesses for selectively engaging at least one of the two battery covers, the rotating tenon comprising a tenon engaging segment;
wherein the rotating tenon is capable of being rotated relative to the casing to make the tenon engaging segment engage the two battery engaging segments of both the two battery covers, and the rotating tenon is capable of being rotated relative to the casing to make the tenon engaging segment engage the battery engaging segment of only one of the two battery covers.

11. A dual-battery tenon structure for engaging at least one of two batteries, the dual-battery tenon structure comprising:
a casing comprising two battery recesses concaved in the casing and spaced apart from each other, the two battery recesses accommodating the two respective batteries; and
a rotating tenon rotatably mounted on the casing, and disposed between the two battery recesses for selectively engaging at least one of the two batteries; the rotating tenon comprising a tenon engaging segment;
wherein the rotating tenon is capable of being rotated relative to the casing to make the tenon engaging segment engage both the two batteries, and the rotating tenon is capable of being rotated relative to the casing to make the tenon engaging segment engage only one of the two batteries.

* * * * *